Nov. 18, 1958  R. E. STEGLER  2,861,164
TOOL FOR ELECTRICAL MACHINING AND THE METHOD
OF MAKING AND USING THE SAME
Filed May 27, 1955

INVENTOR.
Richard E. Stegler
BY
Franz O. Ohlson, Jr.
ATTORNEY.

United States Patent Office 2,861,164
Patented Nov. 18, 1958

2,861,164

TOOL FOR ELECTRICAL MACHINING AND THE METHOD OF MAKING AND USING THE SAME

Richard E. Stegler, Stony Brook, N. Y., assignor to Republic Aviation Corporation, Farmingdale, N. Y., a corporation of Delaware Application May 27, 1955, Serial No. 511,605

11 Claims. (Cl. 219—69)

This invention relates to tools for use in electrical machining and the method of making and using the same.

During electrical machining, an electrical discharge or arc between a tool and the workpiece impinges against and disintegrates the material of the workpiece. At the same time the tool is similarly affected by the same discharge or arc and therefore also disintegrates. As close tolerance or spacing must be maintained between the tool and workpiece, the disintegration of the workpiece and of the tool rapidly varies this tolerance by increasing the space between the tool and the workpiece. Hence the tool must be frequently replaced. Moreover, in the electrical machining of certain materials such as honeycomb core material and other materials which inherently are fragile and not entirely self-supporting during forming, it is necessary to accurately and firmly support the workpiece during the entire machining operation in order to maintain the required tolerance between the workpiece and the tool.

Therefore, among other objects the present invention contemplates a tool for use in electrical machining wherein the body of the tool serves as a die for establishing the desired contour of the finished workpiece and upon which a replaceable machining face is readily formed and supported. Further, in instances where the workpiece is of a relatively fragile or semi-rigid material, the tool is used not only to produce an initial desired contour on the workpiece, but also to support the workpiece during subsequent machining operations.

Figure 1:
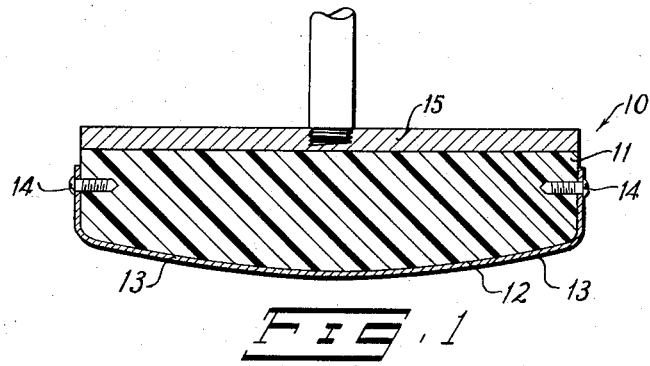
Figure 2:
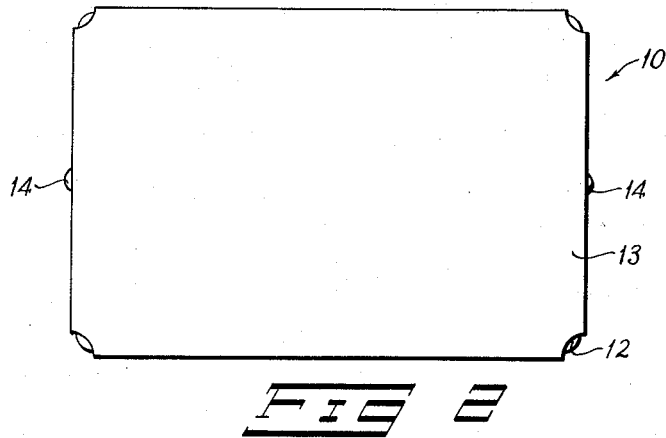
Figure 3:
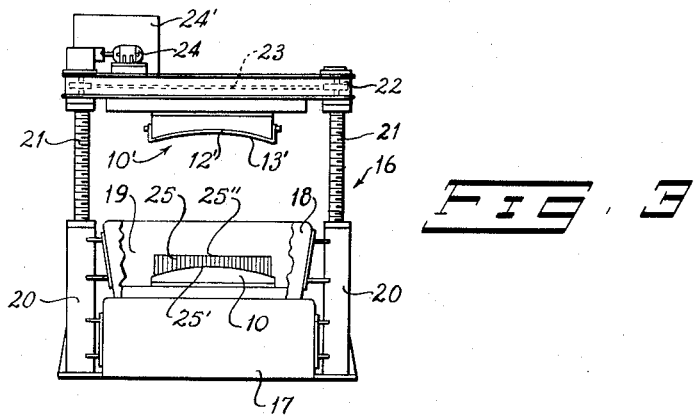

With the above and other objects in view as will be apparent, this invention consists in the steps, construction, combination and arrangement of parts all as hereinafter more fully described, claimed and illustrated in the accompanying drawings wherein:

Fig. 1 is a longitudinal section through the tool; and
Fig. 2 is a plan view thereof.
Fig. 3 is an end view of an electrical machine showing the instant tool installed therein as used in the machining of a workpiece of honeycomb material.

In electrical machining, the distance or gap between the workpiece which serves as one electrode and the tool which serves as the other electrode, is critical and must be kept within close tolerances in order for the process to properly function. Heretofore, it has been the practice to make the tool from any suitable material having good electrical conducting properties and to provide it with a contoured surface, or surfaces, for producing a desired contour or shape on or in the workpiece. The contoured or machining surface of the tool has usually been formed by machining, grinding or other similar finishing techniques. However, during electrical machining of the workpiece, the electric discharge or spark that disintegrates the material of the workpiece also disintegrates the contoured or machining surface of the tool with the result that it is so damaged or destroyed that it becomes impossible to produce a workpiece to the desired contour or shape. It becomes necessary, therefore, to frequently replace the tool. While the damaged tool may in some instances be refinished to re-establish the desired contoured or machining surface thereon, such refinishing is often costly and time-consuming.

The present invention proposes a tool having a body that is provided with a contoured surface which serves as a die for establishing a desired shape of the workpiece and upon which is readily formed and supported a removable or replaceable "machining" face. Thus, during the electrical machining of a workpiece, the damage or destruction of the tool is limited to its replaceable "machining" face and the contoured surface of the body of the tool is unaffected. Moreover, since the body of the tool serves as a die upon which the "machining" face is formed and supported, it becomes relatively simple to renew the tool by stripping off or otherwise removing the damaged "machining" face and replacing it with a new one that is formed directly on or by the contoured surface of the body.

The electric machining of the workpieces fabricated from relatively soft or semi-rigid materials, such as honeycomb aluminum and the like, requires the continual support of the workpiece during all forming or machining operations. The present tool and the method of its use as contemplated herein affords means for such supporting of the workpiece. In short, the tool is first used to machine one side or portion of the workpiece. Thereafter the workpiece is reversed and nested with the "machining" face of the same tool or an identical tool in order to support the workpiece during one or more subsequent machining operations on the opposite or unmachined side of the workpiece.

Referring now to the drawing, in particular Figs. 1 and 2, 10 designates a tool comprising a body or die 11 having a contoured surface 12 formed thereon and a removable "machining" face 13 for the contoured surface 12.

In this instance, the body 11 may be fabricated from a suitable dielectric material such as epoxy resin and the "machining" face 13 from an electrical conducting metal such as sheet copper. The face 13 is formed on the body 11 and in conformity with the contoured surface 12 thereof, by any conventional means. For example, the "machining" face 13 may be hand-formed on the body 11, or may be placed in its flat form on the body 11 and pressed into conformity therewith in a conventional press. Thereafter, the face 13 is secured to the body 11 by any suitable means such as the screws 14.

In short, the body 11 and its contoured face 12 comprise a permanent fixture which may be used either as a tool to form any number of machining faces or elements 13 or as a support for one of these replaceable faces 13 during the machining operation.

It is to be understood, however, that the body 11 need not be fabricated from a dielectrical material nor need the "machining" face 13 be formed of sheet copper. If desired, the body 11 may be made from any suitable material including metal. Moreover, the face 13 may be of a metallic or electrical conducting material that can be sprayed, painted, electro-deposited, or otherwise applied to the contoured surface 12. The only requirements being that the face 13 be of an electrical conducting material, and readily removable from, and replaceable on, the contoured surface 12. Thus, in the event the face 13 is of a material that is sprayed or otherwise applied to the contoured surface 12, it should be capable of being readily peeled or otherwise removed therefrom. In the event the tool body is fabricated from a metal or other electrical conducting material, it is advisable to interpose a layer of dielectric material or some other suitable insulator between the contoured surface of the body and the adjacent surface of the face 13 in order to prevent damage to the contoured surface 12 should the tool be used to point where the electric spark penetrates through the face 13.

The body 11 of the tool 10 is provided with any suitable attachment means, for example, a mounting or base plate 15, whereby it may be operatively positioned and secured within any conventional electrical discharge machining unit such as, for example, the unit 16 shown in Fig. 3.

The electrical machining unit 16 comprises a rectangular base 17 upon which is mounted an open-top rectangular tank 18 partially filled with a non-conductive fluid 19. At each of its corners, only two of which are shown, the base 17 has fixedly secured thereto a vertically disposed column or post 20. Each post 20 is exteriorly threaded to engage the threads of a lead screw 21 that extends vertically out of its upper extremity. At their upper ends, the lead screws 21 are received for free rotation in the corners of a rectangular head 22 to thereby support it in a horizontal position parallel to the base 17 and tank 18 and for vertical movements relative thereto. The lead screws 21, which are mounted one in each of the corners of the head 22, are interconnected by any suitable means such as a chain and sprocket drive 23 and one is connected to a motor 24 to be driven thereby. The motor 24, in turn, is connected to a control box 24', and through the latter, to a conventional electric circuit including a power source (not shown).

As shown in Fig. 3, one tool 10 is secured or positioned on the bottom of the tank 18. A workpiece 25, in this instance made from honeycomb aluminum, previously machined on one side by the tool 10 in a manner similar to that hereinafter described, is positioned thereon with its finished side 25' nested with the face 13 of the tool 10 disposed on the bottom of the tank 18. The workpiece 25 is thereby supported by the tool 10 for the finishing or machining of its opposite side 25'' by a tool 10', similar in construction to the tool 10, but having a different contoured surface 12' and a replaceable face 13' formed in conformity therewith. The tool 10' is mounted to the lower or under-side of the head 22 with its face 13' positioned directly above the unfinished side 25'' of the workpiece 25.

As above set forth, the motor 24 is connected through a control box 24' to an electrical circuit, including a power source. The face 13' of the tool 10' and the workpiece 25 are also connected through suitable electrical leads (not shown) to the control box 24', and through the latter, to the electrical circuit, to the end that they serve as electrodes across which an electrical arc or discharge is produced when they are brought into close proximity. The control box 24' is so constructed and arranged that it connects the motor 24 to the electrical circuit to drive the motor 24 and the interconnected lead screws 21 in such a manner that the head 22 and the tool 10' secured thereto are moved relatively to the workpiece 25 to maintain a predetermined gap between the "machining" face 13' of the tool 10' and the upper or adjacent side 25'' of the workpiece 25 across which the electrical arc is produced. This electrical spark or arc disintegrates the material of the workpiece 25 to thereby machine it into exact conformity with the face 13', and hence the contoured surface 12' of the tool 10'. The electrical machine 16, its components and electric circuiting form no part of the present invention and therefore are not shown and described in detail.

As above described, the electrical arc not only disintegrates the material of the workpiece 25, but also the "machining" face 13' of the tool 10'. However, when the face 13' becomes damaged or destroyed to the point where it no longer produces a satisfactory contour on the workpiece 25, it may be readily replaced as hereinbefore set forth.

In instances when the desired contour of the workpiece 25 requires the removal of a substantial amount of the workpiece or where extremely close tolerances are required in the finished workpiece, the damaged or destroyed "machining" face 13' may be used to rough-machine the workpiece, after which the desired contour is achieved by the use of a new or undamaged face 13'.

Having thus described the electrical machining tool and the method of making and using the same, it is apparent that the various objects and advantages hereinbefore set forth have been accomplished. In short, the instant invention provides a tool of the above type having a contoured surface and a replaceable machining face to be situated thereon. Moreover, the tool is made by providing the tool body with a contoured surface for producing the desired contour on a workpiece, forming a replaceable "machining" face on the contoured surface and in conformity therewith, and supporting the "machining" face thereon during the electrical machining of a workpiece. The tool thus formed can also thereafter be used to support the workpiece during subsequent machining operations thereon by nesting the finished side or portion thereof with the "machining" face of the tool.

What is claimed is:

1. A tool for use in the electrical machining of a workpiece, said tool comprising a body having a contoured surface in flush abutment therewith for producing a complemental contour on the workpiece, a replaceable face element of electrical conductive material formed in exact conformance with the contoured surface of said body and adapted to be removably mounted on said contoured surface, and a layer of insulating material interposed between the adjacent surfaces of said body and said face element.

2. A tool for use in the electrical machining of a workpiece, said tool comprising a body of dielectric material having a contoured surface for producing a complemental contour on the workpiece, and a replaceable face element of electrical conducting material for removable attachment to the contoured surface of the body, said replaceable face element having the exact contour of the contoured surface of the body and positioned in flush abutment therewith.

3. In the method of electrical machining a frangible workpiece, the steps consisting of machining a portion of the workpiece with a tool, nesting and supporting the machined portion of the workpiece on the tool, and machining another portion of the workpiece with another tool while supporting the workpiece as aforesaid.

4. The method of making a tool for use in the electrical machining of a workpiece, consisting of the steps of forming a contoured surface on a body of dielectric material for producing a contour on the workpiece, and spraying an electrical conducting material on said contoured surface to produce a machining face thereon.

5. The method of making a tool for use in the electrical machining of a workpiece, consisting of the steps of contouring a surface of a tool body to produce a selected contour on the workpiece, forming a sheet metal working face element on said tool body to conform exactly with the contoured surface of said tool body, and releasably securing said working face element on and in flush abutment with the contoured surface of said tool body.

6. The method of making a tool for use in the electrical machining of a workpiece, consisting of the steps of contouring a working surface on a body of dielectric material to produce a contour on the workpiece, forming a face element of electrical conducting material on said body to conform exactly to the contour of said working surface, and attaching it to said body in flush abutment with the working surface thereof.

7. The method of making a tool for electrical machining consisting in forming a tool body of dielectric material with a working face contoured to produce a contour on a workpiece, using said tool body initially as a die to form a plurality of machining faces of electrical conducting material on the contoured working face of said tool body, and removably attaching one of said machining faces over and in flush abutment with the working face of the tool body.

8. The method of electrical machining a workpiece consisting of forming a contoured surface on a tool body of dielectric material to produce a complemental contour on a surface of the workpiece, using said tool body initially as a die to form a plurality of working face elements of electrical conducting material on the contoured surface of the tool body, removably attaching one of said working face elements on the contoured surface of said tool body, machining a surface of the workpiece into conformance with the working face element as it is supported on said tool body, and nesting the machined surface of the workpiece on the working face element by which it was machined to thereby support the workpiece, whereby further work may be performed on the workpiece while it is so supported.

9. The method of electrical machining a workpiece consisting of forming a tool body of dielectric material having a contoured surface to produce a contour on the workpiece, initially using said tool body as a die to form a plurality of face elements of electrical conductive material on said contoured surface and in exact agreement therewith, removably securing one of said face elements on and over said contoured surface whereby said face element is supported by said tool body, machining a portion of the workpiece into approximate agreement with said face element to thereby rough-finish said portion of the workpiece, removing the face element from said tool body and replacing it with another of said face elements, machining the rough-finished portion of the workpiece into exact agreement with the face element then supported by said tool body to thereby finish the machining of said portion of the workpiece, and nesting the finished portion of the workpiece on the face element used in finishing it whereby the workpiece is supported thereby during subsequent machining thereon.

10. The method of electrical machining a workpiece consisting of forming a contoured surface on a body of dielectric material for producing a contoured surface on the workpiece, forming a working face element of electrical conductive material on said contoured surface and in exact conformance therewith to thereby produce a tool, using said tool to machine a surface of the workpiece into exact conformance with the face element of said tool, nesting the machined surface of the workpiece on the face element of said tool by which it was machined to thereby support the workpiece, and machining the opposite surface of the workpiece by another tool while so supported.

11. The method of electrical machining a workpiece consisting of forming a contoured surface on a body of dielectric material for producing a contoured surface on the workpiece, forming a working face element of electrical conductive material on the contoured surface of said body and in exact conformance therewith to thereby produce a tool, using said tool to machine a surface of the workpiece into exact conformance with the face element of said tool, nesting the machined surface of the workpiece on the face element of said tool by which it was machined to thereby support the workpiece for further operations thereon.

References Cited in the file of this patent

UNITED STATES PATENTS

| | | |
|---|---|---|
| 1,300,068 | Weed | Apr. 8, 1919 |
| 2,650,979 | Teubner | Sept. 1, 1953 |
| 2,667,437 | Zoubek | Jan. 26, 1954 |

FOREIGN PATENTS

| | | |
|---|---|---|
| 624,329 | Great Britain | June 2, 1949 |
| 1,090,023 | France | Oct. 13, 1954 |
| 727,681 | Great Britain | Apr. 6, 1955 |

OTHER REFERENCES

Article "Electroerosion," pp. 64 and 66 of The Welding Engineer, July 1947.

Electrospark Machining, pages 701 to 705 of September 1953 issue of Mechanical Engineering.